Jan. 23, 1951 T. A. RIANDA 2,539,271
GOPHER PROBE
Filed Oct. 22, 1947
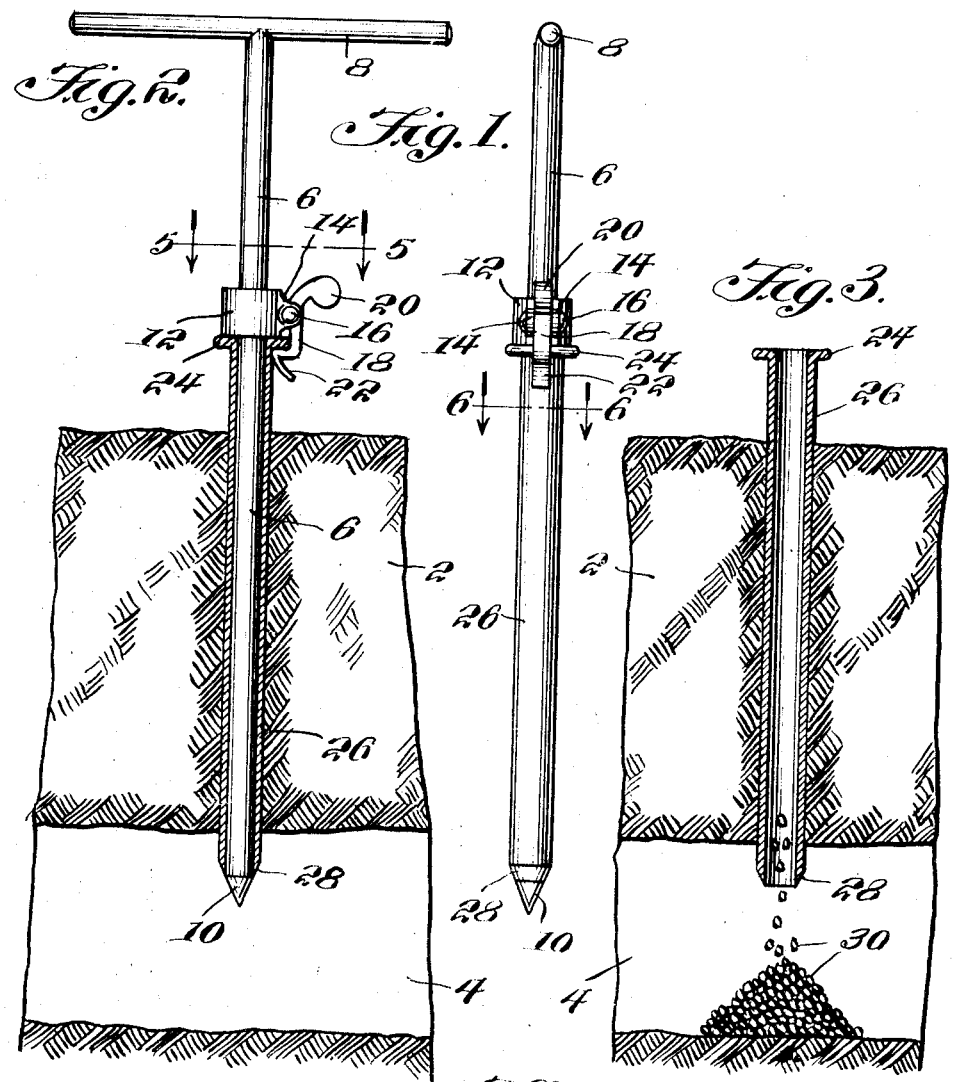
INVENTOR.
Tom A. Rianda,
BY Victor J. Evans & Co.
ATTORNEYS Patented Jan. 23, 1951

2,539,271

UNITED STATES PATENT OFFICE 2,539,271

GOPHER PROBE

Tom A. Rianda, Gonzales, Calif.

Application October 22, 1947, Serial No. 781,351

2 Claims. (Cl. 43—124)

My present invention relates to an improved gopher tunnel probe of the type employed to penetrate the earth in locating the underground runs of gophers and to provide a simple means by which, when the tunnel has been located, a quantity of poisoned food or bait may be inserted into the tunnel without unnecessary digging operations to locate the tunnel.

Generally my device consists in a sharpened or pointed tool including a tubular shell and an interior removable rod so that when the probe has located the tunnel, the rod may be removed and the bait dropped therein through the tubular shell.

In the accompanying drawings I have illustrated one complete example of the physical embodiment of my invention according to the best mode I have thus far devised, but it will be understood that various changes and alterations may be made in the exemplified structure within the scope of the appended claims.

In the drawings:

Fig. 1 is a front elevational view of the probe of my invention.

Fig. 2 is a side elevational view with the outer tubular shell in section.

Fig. 3 is a sectional view of the shell with the rod removed for dropping the bait.

Fig. 4 is a detail view showing the latch for securing the shell and rod.

Figs. 5 and 6 are sectional views at the indicated lines of Figs. 1 and 2.

Referring now to the drawings I have shown a section of earth 2 and a lower underground tunnel 4 consisting of a gopher run.

To locate the tunnel from above ground I employ a tool consisting of the rod 6 having a transversely disposed cross handle 8 and its lower end is tapered at 10 to a sharp conical point. A collar 12 has lugs 14 to receive the pin 16 which pivotally secures latch 18 having a finger control 20, and hook 22.

The hook is designed to engage the flange 24 of the tube 26 which fits snugly about the rod, and the lower open end is beveled at 28 to merge with the conical end of the rod to form a complete point.

The assembled probe is inserted in the ground in the selected area until a sudden drop in resistance shows that the probe has entered a tunnel. The latch is then tripped and the rod is removed from the tube leaving the tube in the inserted position.

Then poisoned bait 30 may be dropped through the tube into the tunnel, and by re-inserting the rod in the tube, the tube may easily be removed and the probe is ready for further use.

Having thus fully described my invention what I claim as new and desire to secure by Letters Patent is:

1. A gopher tunnel probe comprising a rod having a tapered pointed end, a tube having an annular flange at one end thereof snugly fitting about the rod and having its other end beveled to merge into the taper of the rod point, and a latch on the rod for detachably securing the tube on the rod through the flange thereof.

2. In an implement for inserting poison foods in ground tunnels of animals and the like, the combination which comprises a T-shaped rod having an elongated stem with a point on the lower end and having a transversely disposed cross bar providing a handle on the upper end, a collar positioned around the stem of the rod and spaced from the cross bar providing the handle, a spring actuated latch on said collar and extended downwardly therefrom, and a sleeve having a beveled lower end and a flanged upper end slidably mounted on the lower part of the stem with the flange thereof adapted to be gripped by the said spring actuated latch for temporarily retaining the said sleeve on the stem of the rod, whereby with the rod pressed into the ground with the sleeve on the stem thereof the rod may be released and removed from the sleeve and poison products may be inserted through said sleeve into a tunnel into which the lower end of the sleeve extends.

TOM A. RIANDA.

REFERENCES CITED

The following references are of record in the file of this patent:

UNITED STATES PATENTS

| Number | Name | Date |
|---|---|---|
| 1,296,771 | Dady | Mar. 11, 1919 |
| 1,851,843 | Inman | Mar. 29, 1932 |
| 1,856,809 | Gibson et al. | May 3, 1932 |
| 2,390,686 | Bishop | Dec. 11, 1945 |

FOREIGN PATENTS

| Number | Country | Date |
|---|---|---|
| 177,426 | Great Britain | Mar. 30, 1922 |